United States Patent
Dutta

(10) Patent No.: US 6,658,462 B1
(45) Date of Patent: Dec. 2, 2003

(54) SYSTEM, METHOD, AND PROGRAM FOR BALANCING CACHE SPACE REQUIREMENTS WITH RETRIEVAL ACCESS TIME FOR LARGE DOCUMENTS ON THE INTERNET

(75) Inventor: Rabindranath Dutta, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/383,739

(22) Filed: Aug. 26, 1999

(51) Int. Cl.[7] ............................................. G06F 15/16
(52) U.S. Cl. ...................................................... 709/219
(58) Field of Search ................................ 709/203, 232, 709/219, 217, 236

(56) References Cited

U.S. PATENT DOCUMENTS

| | | |
|---|---|---|
| 5,353,426 A | 10/1994 | Patel et al. |
| 5,555,391 A | 9/1996 | De Subijana et al. |
| 5,634,052 A | 5/1997 | Morris |
| 5,671,246 A | 9/1997 | McIntyre |
| 5,740,430 A | 4/1998 | Rosenberg et al. |
| 5,754,774 A | 5/1998 | Bittinger et al. |
| 5,768,515 A | 6/1998 | Choquier et al. |
| 5,787,461 A | 7/1998 | Stephens |
| 5,787,472 A | 7/1998 | Dan et al. |
| 5,852,717 A | 12/1998 | Bhide et al. |
| 5,859,971 A | 1/1999 | Bittinger et al. |
| 5,864,852 A | 1/1999 | Luotonen |
| 5,873,100 A | 2/1999 | Adams et al. |
| 5,878,213 A | 3/1999 | Bittinger et al. |
| 5,890,211 A | 3/1999 | Sokolov et al. |
| 5,906,000 A | 5/1999 | Abe et al. |
| 5,918,013 A | 6/1999 | Mighdoll et al. |

OTHER PUBLICATIONS

Luotonen, Ari; Web Proxy Servers; 1998; pp. 157–158, 207–210.
Hypertext Transfer Protocol—HTTP/1.1 RFC 2616, IETF.

Primary Examiner—Krisna Lim
Assistant Examiner—Tod Kupstas
(74) Attorney, Agent, or Firm—Marilyn Smith Dawkins

(57) ABSTRACT

A system, method and program stores, in a local cache, only a small part of a large file that is being requested over a network such as the Internet. In a preferred embodiment, the caching agent starts transferring this partial file to the client while it is simultaneously retrieving the remaining portion of the file across the Internet. A preferred embodiment of the invention stores a first page of the browser display in the cache. Other embodiments store more than the first page, or a part of the full file or document, thereby creating a safety margin in storing more than one page. Another preferred embodiment initially stores the full file or document, and if there is a need for cache replacement, the cache is replaced up until the first page is reached. As such, the cache space requirements are minimized for large documents being retrieved over the World Wide Web.

30 Claims, 3 Drawing Sheets

SYSTEM, METHOD, AND PROGRAM FOR BALANCING CACHE SPACE REQUIREMENTS WITH RETRIEVAL ACCESS TIME FOR LARGE DOCUMENTS ON THE INTERNET

BACKGROUND OF THE INVENTION

1. Field of the Invention

This invention relates to caching data from a server to a client and more specifically for caching documents from servers that are a part of the World Wide Web.

2. Description of the Related Art

Within the basic structure of the World Wide Web (WWW or Web), there are many Web clients that are geographically dispersed around the world. Also, there are Web servers that are dispersed around the world. Typically, a Web client makes a request to a Web server to download a document which may contain text, graphics, and/or multimedia data. The Web server receives the request and sends the document back to the Web client. The Internet typically operates over the TCP/IP protocol. Typically, it can take several seconds to transfer data over the Internet. In particular, when the transfer is across continents, the time may be in tens of seconds. In terms of computing speeds, several seconds or more is an undesirably long time. Therefore, mechanisms have evolved to store frequently accessed data closer to the client. The principle of storing frequently used data closer to the client is called caching. Caching, in general, is widely known throughout all client/server systems, including other network systems such as distributed systems, as well as to Internet specific client/server systems.

In the context of the Internet, caching means storing documents retrieved from anywhere on the Web to local storage media. Despite the terminology, the "local" storage media can be physically located anywhere, i.e., physically at the client or remotely from the client through a network connection. For example, caching may take place at various locations on the Internet such as at clients, proxy servers, reverse proxy servers, or even at an origin server. Typically the storage is in disk or main memory, but it is not limited to these types of storage. There is now and will continue to be new means for storing data.

Caching improves performance of the server system. It also reduces latency. Latency is the time from when the client or Web browser makes a request to the Web server to the time the client receives the data. Reducing latency is a main focus of caching. The latency is reduced by storing the data closer to the client. Another focus of caching is to save network bandwidth. That is, if the data is stored close to the client, there is no need to go across the continent via the network to receive the data.

Although caching has its benefits, there are limitations to caching. The physical size of the cache itself is limited. After a while, if data continues to be stored in the cache, some items in the cache will have to be replaced. Since cache space is typically limited, various cache item replacement algorithms have evolved over the years.

Some of the known techniques for replacement include the least recently used (LRU) method and its variations. LRU is one of the most common methods for cache replacement. With this method, any data, or files, or documents that have not been used (e.g., accessed) for some period of time, will get thrown out of the cache when there arises a current need for more available cache space. Another variation of LRU is the weighted LRU method. The weighted LRU weighs the least recently used algorithm by the number of recent accesses. It can also put different weights on the retrieval transfer time and the remaining freshness time. Remaining freshness time denotes the amount of time left before the cached data should be refreshed. This arises because there are various attributes of data cached on the WWW, which is part of the HTTP protocol, whereby any document downloaded from the WWW pursuant to HTTP 1.1 can suggest to the caching agent as to the length of time that it wants its data to be stored in a cache. For example, advertisers typically specify that their data can not be cached. They want their data to expire immediately so that they can put out new advertisements. Other weighting techniques include weighting by transfer time, positive weighting by size, and negative weighting by size. All of the above describe methods of cache replacement are well known in the art.

Internet traffic over the World Wide Web has been increasing very rapidly in the last few years. This has made caching of paramount importance in order to reduce network congestion on the Internet. Many of the caching algorithms consider document retrieval transfer time as one of the key elements in determining the cache item replacement strategy. The doctrine dictating such algorithms is that documents that take a large amount of time to retrieve over the network, and are also likely to be accessed frequently, should typically be stored in a cache. Unfortunately, other factors being the same, documents that take a large amount of time to retrieve are typically large files. Since there is a limited amount of cache space, storing large files exhausts the cache space quickly.

In situations where origin servers typically have large files which can be requested from a client, and the large files typically result in a large transfer time over the Internet, the previously described prior art cache replacement techniques have limitations in their effectiveness and usefulness. On the Internet, the time to download is a significant time factor. When it takes a long time to download a given large file to a client, most caching proxies or other caching agents on the Web prefer to store the file in a local cache. However, the cache space is limited. Therefore, there has to be a balancing method between how many files are kept in the cache, what size of files are kept, and the length of time that they are kept. Although there are prior art methods that try to mathematically apply different weights between large files and other factors to come to a compromise solution, these compromised solutions are just that; and they do not take into consideration the Internet specific concerns addressed by the invention herein.

SUMMARY OF THE INVENTION

The preferred embodiments of the present invention take into consideration certain characteristics of the Internet including the time involved in users accessing, displaying, and utilizing documents; the size of documents, and the finite, if not limited, amount of cache space. A given document, which has been accessed by the user and is being displayed to the user at a client machine or browser, may have originated at one point in time from an origin server somewhere within the network, and is now being displayed locally from a local cache. Relative to computer transmission speeds, once the document is displayed on the client's browser, the user may utilize a significant amount of time in "interacting with" the displayed document. The time may be spent in reading or even just glancing at the displayed document. Even a given click of a mouse button in selecting a link or item displayed within the document takes a relatively significant amount of time. The mere process of displaying the document on the display (e.g., by rendering HTML) also involves time.

The size of documents being transmitted over the Internet raises areas for consideration. First, it is noted that typically a document is larger than what a Web browser can accommodate. Second, a large document may take a significant amount of time in being transmitted across the network.

The time for a Web browser to display a first page of a documents that a user can read that first displayed page is critical in terms of retrieval time. A user is usually content if as soon as a user clicks to retrieve a page, the user has something to read on a display from the desired retrieved document.

Taking this into consideration, the preferred embodiments of this invention disclose a system, method and program for storing in a local cache only a small part of a large file rather than the complete file. In a preferred embodiment, the caching agent starts transferring this partial file to the client while it is simultaneously retrieving the remaining portion of the file across the Internet.

As such, by the time the user wants to read more, the remaining portion of the document has been downloaded from the Web. The time to display or read one page, or move from one page to the next page, e.g., via scrolling, is typically enough time to retrieve the rest of the document if only the first page or so of the document is stored in a cache. There are various changes to this principle since often it is not known how much of a document is the first page. That is, other sized portions of the file may be stored in the cache as long as some part of the given portion can be displayed on the browser quickly. Typically the given portion should be significantly smaller than the total size of the document.

The preferred embodiments of the invention recognize that there is no need to store the full file or document in the cache. A determination is made as to how much of the file is to be stored in cache. A preferred embodiment of the invention stores a first page of the browser display in the cache. Other embodiments store more than the first page, or a part of the full file or document, thereby creating a safety margin in storing more than one page. Other embodiments may store less than one page for displaying on the client. This may also gain some efficiency. Another preferred embodiment initially stores the full file or document, and if there is a need for cache replacement, the file or document is incrementally truncated in the cache up until the first page is reached.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1:
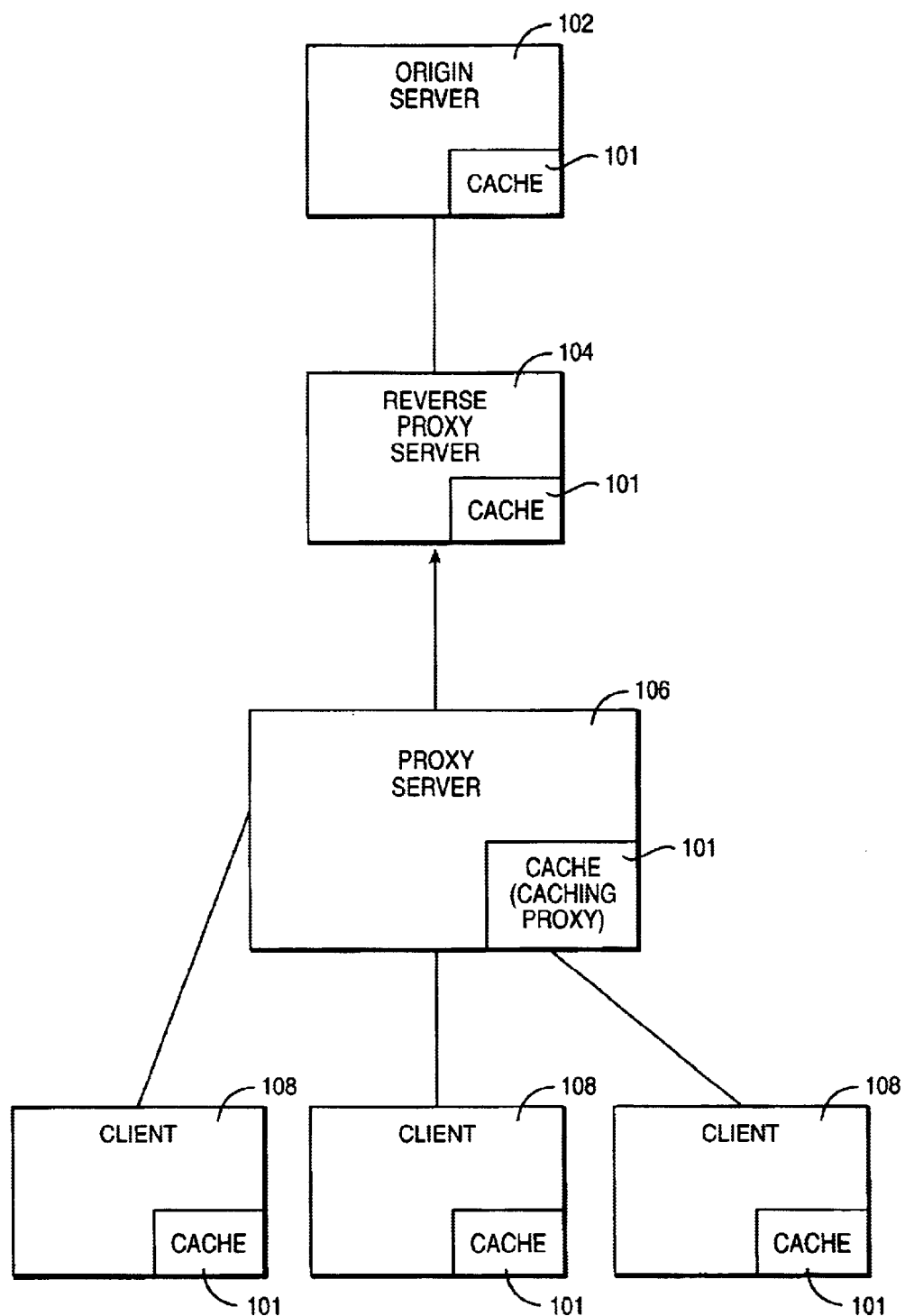
FIG. 1 illustrates an exemplary structure of computer systems connected via a network such as the Internet, and the various places within this structure where caching may be carried out.

FIG. 1 shows a block diagram of a hierarchical structure of networked systems within an Internet structure. Various gateways and routers are also common elements found within a typical Internet structure, but are not shown in FIG. 1. Instead, the simplicity of the block diagram of FIG. 1 is used to illustrate the various places where caching may be carried out throughout the Internet structure.

The preferred embodiments of the invention can utilize a cache at any point within the Internet structure; either at the client machines 108, at a proxy server 106, at reverse proxy servers 104, or at the origin server 101 itself. As examples of the cache being located at a client 108, Netscape Browser and Microsoft Internet Explorer have caches which are situated on the user's computer. A proxy server, such as those maintained by America Online (AOL) which groups a large number of users together before passing a request out to the Internet, could also have a cache. If the cache is very large and the principal work of the proxy server is to perform caching, the proxy server is referred to as a caching proxy. Caching proxies are in wide use on the Internet. One of the most common caching proxies is SQUID. The origin server 102 may also have a cache. If the origin server determines that a particular document is frequently accessed, the origin server will store that document in memory rather than on disk. Most of the files at the origin server 102 are on permanent storage such as disk. The type of memory used for the cache typically enables a faster retrieval time than the storage used for the document itself at the origin server. Sometimes the origin server will go to a database server outside of the origin server to retrieve the desired data. As such, the origin server may store the retrieved data locally in its cache at the origin server. The cache may also be located at any other type of server including a file server.

In some Internet structures there is a reverse proxy server 104 between an origin server 102 and Internet provider or proxy server 106. In such configurations, a cache 101 can be located at the reverse proxy server 104. The present invention could therefore be implemented using a cache at either a client, or proxy server, or reverse proxy server, or at an origin server, or a database server if the database server is connected to the origin server, or at any other type of server including a file server. Throughout the description of this invention, the term "caching agent" is used to refer to the cache at any one of these entities.

Figure 2:
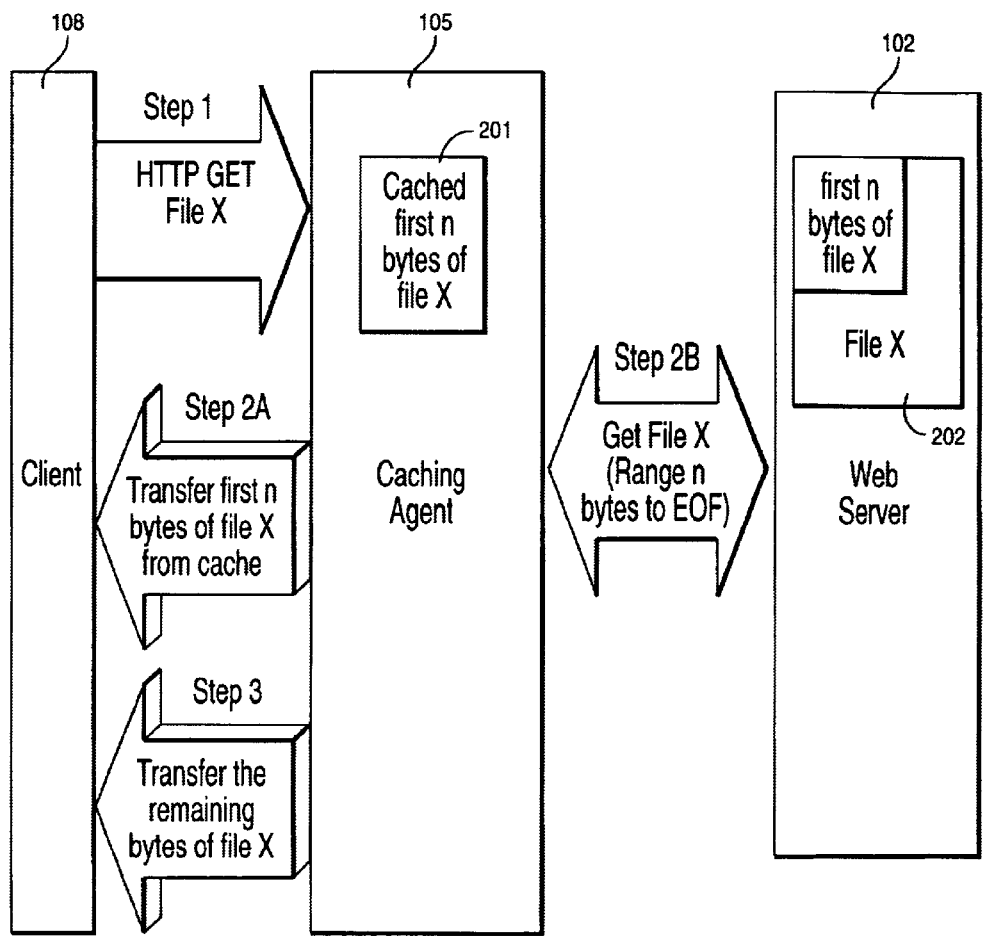
FIG. 2 is a network of systems comprising a client, caching agent and server for carrying out document retrieval using the caching technique of a preferred embodiment of the invention.

FIG. 2 shows the system and process flows of a preferred embodiment of the invention. The overall network system includes a client 108, a caching agent 105, and a Web server 102. The overall process flow between the components of the network system is described with reference to FIG. 2.

The client 108 requests a file 202 through an HTTP GET on file X, 1. The caching agent 105 may have stored the first n bytes of the file X in the cache, 201. The caching agent 105 begins transferring the first n bytes of the file from the cache 201 to the client 108, 2A. Simultaneously with this transfer, the caching agent 105 requests bytes n+1 through the last byte of the file from the Web server, 2B. After the caching agent 105 transfers the first n bytes of the file from its cache 201 to the client 108, 2A, the caching agent 105 transfers the remaining bytes of the file that it receives from the Web server 102 to the client 108, 3.

Other embodiments may take into consideration the size of the cache 201 in the caching agent 105, the amount of time that it takes to send the n bytes of the file from the cache 201 to the client 108 in step 1, and the amount of time that it takes to retrieve the remaining bytes of the file from the Web server 102, in step 2B. For example, the caching agent 105 may begin receiving the remaining bytes from the Web server 102 into a cache if the caching agent 105 begins receiving the file before the transfer of the first n bytes from the cache to the client is complete. Or, if the first n bytes of the file have been received by the client from the cache of the caching agent, but the caching agent has not received all of the bytes of the remaining file from the Web server, then the caching agent may be involved in transferring or caching partial files from the Web server as the partial files are received. There are various modifications to the preferred embodiment that can be made that takes into account the various schemes for carrying out various timings of retrieving and storing and sending partial files on the Web and the amount, i.e., size, of the partial file to store.

Figure 3:
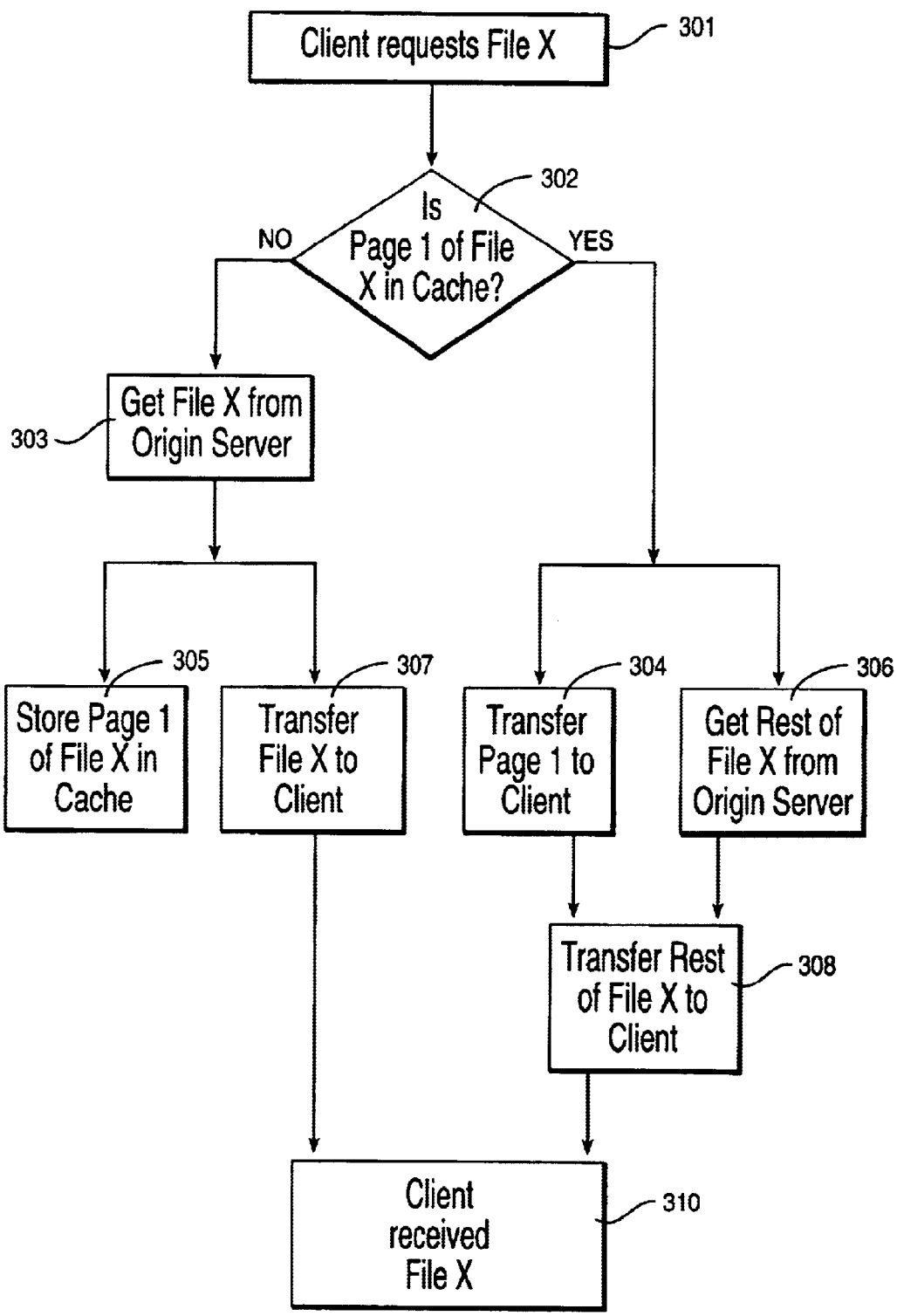
FIG. 3 is an overall flow of the caching method of a preferred embodiment.

An overall flow of a simplified preferred embodiment of the invention is shown in FIG. 3. The client requests file X, step 301. The caching agent determines if page one of the file is in its cache, step 302. Depending upon the answer, the caching agent takes one of two process flows.

If the answer is No, this means that maybe this is the first time that this file has been requested and it is not in the cache. For a No determination, the caching agent gets the file from the origin server, step 303. The next two steps, 305, 307, are performed in parallel. The caching agent begins transferring file X from the origin server to the client, step 307; and the caching agent will store the first page of file X in its cache, step 305. In another embodiment, the caching agent will store the complete file in its cache in step 305, and then later, if cache replacement is necessary, the caching agent will replace all but page one of file X as needed by the caching agent for other files. If the remaining cache space is smaller than the size of the file, and cache item replacement is not desired at that time, then the caching agent may store as much as the file as it can.

If it is determined that the first page of the file is in the cache, then the following two steps, steps 304 and 306 are performed in parallel. The caching agent begins transferring the first page of file X from the caching agent's cache to the client, step 304; and the caching agent gets the rest of the file from the origin server, or from another caching agent further up in the hierarchy of caching agents as discussed further below, step 306. The rest of the file is then transferred to the client, step 308. At the end, the client receives file X, step 310.

The ability to get a partial file, such as the remaining bytes of file X in step 306 FIG. 3, has been enabled through the HTTP 1.1 protocol. Getting partial files was not possible with HTTP 1.0. According to HTTP 1.1, a requester can get a partial file by specifying a GET with a byte range on the HTTP request:
GET Byte Range To store a first page of a file in the cache of the caching agent as in step 305, FIG. 3, the caching agent needs to know the size of the monitor of the client. For example, for a monitor that has a resolution of 1024 bytes by 768 bytes, a client will typically render a browser page on a portion of such a display, such as on a right or left portion where the other portion may contain a content page or navigation area or other user information. Based upon the resolution size of a given display and/or the rendering area for displaying the document, a size or even just an approximate size of a first page of a displayed document is determined. Using the same principle by which a client renders a document, the caching agent can determine the size of a first page based upon a typical or likely client rendering area of a display.

It should be noted that the preferred embodiment of this invention is applicable to any Web client, including hand held clients such as palmtops to telephones and to other client machines. Such devices are quite varied and include, for example, personal digital assistants (PDAs), business organizers (e.g., IBM WorkPad and the 3Com PalmPilot), smartphones, cellular phones, other hand held devices, and the like. Depending upon the type of client, the size of the first rendered page may be different. If the caching agent is aware of this, the caching agent can determine the size of the first page. If not, the caching agent can determine a minimum first page size that will take into account even the largest rendered area of a typical, common, or possible client.

However, typically, in the HTTP protocol, there is a user agent field in an HTTP request which specifies the type of client. Depending upon the type of client specified, the caching agent can make a more accurate determination of the size of the first page that will be rendered. However, it is not necessary to determine with any degree of accuracy the size of the first page. Even if the size of the document that is cached by the caching agent in step 305, FIG. 3 as described above is actually more than one page of the document as rendered on a given client, the efficiencies of the preferred embodiment can still be realized. What is important is for the caching agent to cache a beginning portion of the document that is less than the whole document so that the beginning portion of the document can be transferred to the client while the remaining portion of the document is retrieved from the origin server.

With reference to step 306, FIG. 3, in the description above, it was disclosed that the rest of the file may be retrieved from the origin server or from another caching agent further up the hierarchy of caching agents towards the origin server. Typically, when caching within the Internet structure, there is a client such as a Web browser that has a local cache. Further up the hierarchy there may be a proxy that has a proxy cache. At the top of the hierarchy is the cache at the origin server. This hierarchy was shown with relation to FIG. 1.

When the client makes a request, the request first goes to the client's local cache, if any. Typically, a hand held device will not have a client cache. Also, a Web browser may have disabled its client cache. If the requested information is not at the client cache, then the request goes to the proxy. The GET request is transferred from the local cache on up the hierarchy of caches until the origin server or the origin server's cache is reached. A cache further up the hierarchy of caches is referred to herein as an upstream cache.

Since storage space is at a premium on a user's computer, i.e., the client, the preferred embodiment of this invention is very useful if it is practiced in conjunction with the local cache of the client. That is, the clients local cache would only need to accommodate a first page of a document. The remaining document would then be retrieved from the next cache along the hierarchy of caches. If the remaining document did not reside within one of the hierarchy of caches, then the remaining document would be retrieved from the origin server or the origin server's cache.

For example, America Online (AOL) is one of the largest Internet network providers. AOL's caching proxies are enormous. There are some Web sites that have large number of hit rates such as Yahoo and AltaVista. That is, these sites are accessed very frequently by users. As such, America Online uses its proxy caches to store the pages of these Web sites so that AOL does not have to actually go to Yahoo's or AltaVista's or other content provider's origin server for each request.

The preferred embodiments may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass program code, and/or one or more computer programs, and/or data files accessible from one or more computer readable devices, carriers, or media, such as magnetic storage media, "floppy disk", CD-ROM, a file server providing access to the programs via a network transmission line, holographic unit, etc., or any other signal bearing media. Of course, those skilled in the art will recognize that many modifications may be made to this configuration without departing from the scope of the present invention.

The foregoing description of the preferred embodiments of the invention has been presented for the purposes of illustration and description. It is not intended to be exhaustive or to limit the invention to the precise form disclosed. Many modification and variations are possible in light of the above teaching. For example, the terms "data", "documents" and "files" are used interchangeably herein. Whenever one of the terms is used, the other terms are just as applicable. Likewise, although the embodiments are presented in terms of the Internet, other network systems, including Intranets, are just as applicable.

It is intended that the scope of the invention be limited not by this detailed description, but rather by the claims appended hereto. The above specification, examples and data provide a complete description of the manufacture and use of the system, method, and composition of the invention. Since many embodiments of the invention can be made without departing from the spirit and scope of the invention, the invention resides in the claims hereinafter appended.

Having thus described the invention, what we claim as new and desire to secure by letters patent is set forth in the following claims:

What is claimed is:

1. A method for retrieving a file across a network having at least one server, at least one client, and at least one caching agent, the method comprising:
   receiving, by the caching agent, from the client, a get request for the file of an origin server;
   determining a number of bytes (n) of the file that would make up at least a first displayed page of the file wherein the n bytes is a first portion of the file, and wherein the determined number of bytes (n) of the file that would make up the at least the first displayed page of the file is determined based upon a determined rendering area for at least one of i) the requesting client and ii) a plurality of potential requesting clients;
   determining if at least the first portion of the file is stored in a cache of the caching agent; and
   if the at least the first portion is stored in the cache:
      at a same time, i) transferring, by the caching agent, the at least first portion of the file to the client; and ii) requesting, by the caching agent, a remaining portion of the file; and as the requested remaining portion is received, transferring, by the caching agent, the remaining portion of the file to the client.

2. The method of claim 1 wherein the get request conforms to the HTTP 1.1 protocol.

3. The method of claim 1 further comprising: if the at least the first portion is not stored in the cache:
   i) retrieving, by the caching agent, the file; ii) transferring the retrieved file to the client; and iii) storing at least the first portion of the file in the cache.

4. The method of claim 3 wherein if the stored at least the first portion is greater than the determined number of bytes (n) of the file that would make up the first displayed page, replacing up to the first portion during an event of cache replacement.

5. The method of claim 1 wherein the remaining portion is requested from a next entity up an hierarchy of other caching agents and the origin server.

6. The method of claim 1 wherein a size of the first portion stored in the cache enables the remaining portion to be retrieved and to begin being transferred to a Web browser on the client before the first portion can be displayed and scrolled at the client from the cache.

7. The method of claim 1, wherein the server is an upstream cache.

8. A method far retrieving a file across a network having at least one server, at least one client, and at least one caching agent, the method comprising:
   storing a stored portion of the file in a cache of the caching agent; and
   during a cache replacement of the cache,
      i) determining a number of bytes (n) of the file that would make up a first displayed page of the file wherein the n bytes is a first portion of the file, and wherein the determined number of bytes (n) of the file that would make up the first displayed page of the file is determined based upon a determined rendering area for at least one of i) a requesting client and ii) a plurality of potential requesting clients;
      ii) keeping the first portion of the file in the cache wherein the first portion is capable of being rendered as a first page of the file on a display of a client;
   receiving, by the caching agent, a get request for the file from the requesting client;
   determining if at least a first portion of the file is stored in the cache of the caching agent;
   at a same time, if the at least the first portion is stored in the cache, i) transferring, by the caching agent, the at least first portion of the file to the requesting client; and ii) requesting, by the caching agent from a server, the remaining portion of the file; and
   transferring, by the caching agent, the remaining portion of the file to the requesting client.

9. The method of claim 8 wherein the rendering area is based upon at least one of i) a known size of a display monitor, ii) a resolution size of the display monitor, and ii) a rendering area of the display monitor for the first portion.

10. The method of claim 9, wherein the server is an upstream cache.

11. A method for minimizing cache space requirements for a large document being retrieved over the World Wide Web, the method comprising:
   receiving, by a caching agent from a client, a get request for the document;
   determining a number of bytes (n) of the file that would make up a first displayed page of the file, wherein the n bytes is a first portion of the file, and wherein the determined number of bytes (n) of the file that would make up the first displayed page of the file is determined based upon a determined rendering area for at least one of i) the requesting client and ii) a plurality of potential requesting clients;
   determining that at least the first n bytes of the document is stored in the cache of the caching agent from a previous request for the document;

performing the following steps in parallel:
  i) begin transferring, by the caching agent, the first n bytes of the document to the client; and
  ii) requesting, by the caching agent to a Web server, the remaining bytes following the first n bytes; and
  begin transferring, by the caching agent, the remaining bytes following the first n bytes to the client.

12. A network system having at least one server, at least one client, and at least one caching agent, the system comprising:
  means for receiving, by the caching agent, from the client, a get request for a file of an origin server;
  means for determining a number of bytes (n) of the file that would make up a first displayed page of the file, wherein the n bytes is a first portion of the file, and wherein the determined number of bytes (n) of the file that would make up the first displayed page of the file is determined based upon a determined rendering area for at least one of i) the requesting client and ii) a plurality of potential requesting clients;
  means for determining that at least the first portion of the file is stored in a cache of the caching agent; and
  if the at least the first portion is stored in the cache:
  means for transferring, by the caching agent, the at least first portion of the file to the client in parallel with means for requesting, by the caching agent, a remaining portion of the file; and
  means for transferring, by the caching agent, the remaining portion of the file to the client, as the requested remaining portion is received.

13. The caching agent of claim 12 wherein the server is an upstream cache.

14. A caching agent within a network having at least one server and at least one client, the caching agent comprising:
  means for receiving a get request for a file from the client;
  means for determining a number of bytes (n) of the file that would make up a first displayed page of the file for a display size, wherein the n bytes is a first portion of the file, and wherein the determined number of bytes (n) of the file that would make up the first displayed page of the file is determined based upon a determined rendering area for at least one of i) the requesting client and ii) a plurality of potential requesting clients;
  means for determining that at least the first portion of the file is stored in a cache of the caching agent;
  means for transferring the at least first portion of the file to the client in conjunction with means for requesting from a server the remaining portion of the file; and
  means for transferring the remaining portion of the file to the client.

15. The caching agent of claim 14 wherein the caching agent is at the client.

16. The caching agent of claim 14 wherein the caching agent is at a proxy server within the network.

17. The caching agent of claim 14 wherein the caching agent is at a reverse proxy server.

18. The caching agent of claim 14 wherein the caching agent is at an origin Web server.

19. The caching agent of claim 14 wherein the caching agent is at a database server.

20. The caching agent of claim 14 wherein the caching agent is at a file server.

21. The system of claim 14 wherein the get request conforms to the HTTP 1.1 protocol.

22. The system of claim 14 further comprising:
  if the at least the first portion is not stored in the cache:
    i) means for retrieving, by the caching agent, the file; ii) means for transferring the retrieved file to the client; and iii) means for storing at least the first portion of the file in the cache.

23. The system of claim 14 wherein if the stored at least the first portion is greater than the determined number of bytes (n) of the file that would make up the first displayed page, means for replacing up to the first portion during an event of cache replacement.

24. The system of claim 14 wherein the remaining portion is requested from a next entity up an hierarchy of other caching agents and the origin server.

25. The system of claim 14 wherein a size of the first portion stored in the cache enables the remaining portion to be retrieved and to begin being transferred to a Web browser on the client before the first portion can be displayed and scrolled at the client from the cache.

26. A caching agent within a network having at least one server and at least one client, the caching agent comprising:
  means for servicing a request for a file from the client to the server by storing the whole file in a cache of the caching agent;
  means for determining a number of bytes (n) of the file that would make up a first displayed page of the file, wherein the a bytes is a first portion of the file, and wherein the determined number of bytes (n) of the file that would make up the first displayed page of the file is determined based upon a determined rendering area for at least one of i) the requesting client and ii) a plurality of potential requesting clients;
  means for keeping the first portion of the file in the cache during a cache replacement of the cache wherein the first portion is capable of being rendered as a first page of the file on a display of the client;
  means for receiving a get request for the file from the client;
  means for determining that at least the first portion of the file is stored in the cache of the caching agent;
  means for transferring, by the caching agent, the at least first portion of the file to the client in conjunction with means for requesting from the server, the remaining portion of the file; and
  means for transferring, by the caching agent, the remaining portion of the file to the client.

27. An article of manufacture having program code on a computer usable medium for enabling a caching agent within a network of at least one server and at least one client to carry out the steps of:
  receiving a get request, from the client, for a file of an origin server;
  determining a number of bytes (n) of the file that would make up at least a first displayed page of the file, wherein the n bytes is a first portion of the file, and wherein the determined number of bytes (n) of the file that would make up the at least the first displayed page of the file is determined based upon a determined rendering area for at least one of i) the requesting client and ii) a plurality of potential requesting clients;
  determining if at least the first portion of the file is stored in a cache of the caching agent; and
  if the at least the first portion is stored in the cache:
    at a same time, i) transferring the at least first portion of the file to the client; and ii) requesting, by the caching agent, a remaining portion of the file; and as the requested remaining portion is received, transferring the remaining portion of the file to the client.

28. The article of manufacture of claim 27 wherein if the stored at least the first portion is greater than the determined number of bytes (n) of the file that would make up the first displayed page, replacing up to the first portion during an event of cache replacement.

29. The article of manufacture of claim 27 wherein a size of the first portion stored in the cache enables the remaining portion to be retrieved and to begin being transferred to a Web browser on the client before the first portion can be displayed and scrolled at the client from the cache.

30. An article of manufacture having program code on a computer usable medium for enabling a caching agent within a network of at least one server and at least one client to carry out the steps of:

storing a stored portion of the file from the server in a cache of the caching agent upon a first request of the file;

during a cache replacement of the cache, i) determining a number of bytes (n) of the file that would make up a first displayed page of the file, wherein the n bytes is a first portion of the file, and wherein the determined number of bytes (n) is based upon a determined maximum rendering area for a plurality of potential requesting clients;

ii) keeping the first portion of the file in the cache wherein the first portion is capable of being rendered as a first page of the file on a display of the client;

receiving a get request for the file from the client;

determining if at least a first portion of the file is stored in the cache of the caching agent;

at a same time, if the at least the first portion is stored in the cache, i) transferring the at least first portion of the file to the client; and ii) requesting from a server the remaining portion of the file; and transferring the remaining portion of the file to the client.

* * * * *